United States Patent
Liu (10) Patent No.: US 11,868,799 B2
(45) Date of Patent: Jan. 9, 2024

(54) COMMAND INFORMATION TRANSMISSION METHOD, SYSTEM, AND APPARATUS, AND READABLE STORAGE MEDIUM

(71) Applicant: INSPUR SUZHOU INTELLIGENT TECHNOLOGY CO., LTD., Jiangsu (CN)

(72) Inventor: Yunfei Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/016,985

(22) PCT Filed: Jan. 25, 2021

(86) PCT No.: PCT/CN2021/073606
§ 371 (c)(1),
(2) Date: Jan. 19, 2023

(87) PCT Pub. No.: WO2022/032990
PCT Pub. Date: Feb. 17, 2022

(65) Prior Publication Data
US 2023/0229485 A1 Jul. 20, 2023

(30) Foreign Application Priority Data
Aug. 14, 2020 (CN) .......................... 202010820123.5

(51) Int. Cl.
*G06F 9/455* (2018.01)
(52) U.S. Cl.
CPC .................... *G06F 9/45558* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

2016/0132443 A1    5/2016 Davda et al.
2016/0328348 A1*  11/2016 Iba ...................... G06F 9/45558
(Continued)

FOREIGN PATENT DOCUMENTS

CN    101477511 A    7/2009
CN    103984591 A    8/2014
(Continued)

OTHER PUBLICATIONS

Corresponding International Patent Application No. PCT/CN2021/073606, International Search Report, dated May 19, 2021.
(Continued)

*Primary Examiner* — Wynuel S Aquino
(74) *Attorney, Agent, or Firm* — Cooper Legal Group LLC (57) ABSTRACT

Disclosed in the present disclosure is a command information transmission method, applied to a Physical Function (PF) port. The method includes: parsing a received interrupt request to obtain a target Virtual Function (VF) port; determining a target physical-side interrupt handler corresponding to the target VF port; obtaining target command information corresponding to the target physical-side interrupt handler in a device memory overlap region, where the device memory overlap region is an overlap region obtained by performing memory mapping on the PF port and each VF port in a host address space by a device memory overlap mapping technology; and executing switching to the target physical-side interrupt handler, and performing a response operation on the target command information.

19 Claims, 4 Drawing Sheets

(56) References Cited

U.S. PATENT DOCUMENTS

2019/0266117 A1* 8/2019 Duncan ............... G06F 13/4004
2020/0151134 A1* 5/2020 Helmick ............... G06F 3/0659

FOREIGN PATENT DOCUMENTS

| CN | 104123173 A | 10/2014 |
| CN | 105808167 A | 7/2016 |
| CN | 107894913 A | 4/2018 |
| CN | 110609730 A | 12/2019 |
| CN | 111949371 A | 11/2020 |

OTHER PUBLICATIONS

Corresponding International Patent Application No. PCT/CN2021/073606, Written Opinion, dated May 19, 2021.
Yang, Hongbo, "A Study of High Performance Network Virtualization Technique", Chinese Doctoral Dissertations Full-Text Database, No. 10, Oct. 15, 2012, ISSN:1674-022X, pp. 60-63 and 67-73.

* cited by examiner

COMMAND INFORMATION TRANSMISSION METHOD, SYSTEM, AND APPARATUS, AND READABLE STORAGE MEDIUM

This application claims priority to Chinese Patent Application No. 202010820123.5, filed on Aug. 14, 2020, in China National Intellectual Property Administration and entitled "Command Information Transmission Method, System, and Apparatus, and Readable Storage Medium", the contents of which are hereby incorporated by reference in its entirety.

FIELD

The present disclosure relates to a field of a virtualization technology, and particularly to a command information transmission method, system, and apparatus, and a computer-readable storage medium.

BACKGROUND

With extensive popularization and application of virtualization technology, device virtualization technology has also been developed and advanced significantly from initial software virtualization technology to hardware pass-through virtualization technology. The software virtualization technology uses a Virtual Machine Monitor (VMM) to simulate a behavior of a hardware device and forwards all Input/Output (IO) requests to the hardware device. However, it may lead to low performance. The hardware pass-through virtualization technology directly allocates a hardware device to a Virtual Machine (VM) such that the VM does not need to forward an IO request through a VMM. Although the performance is improved, devices cannot be shared. In order to overcome shortcomings of the software virtualization technology and the hardware pass-through virtualization technology, Intel proposes a new hardware virtualization technology: Single Root-Input Output Virtualization (SR-IOV), which solves two key problems about performance and device sharing.

Figure 1:
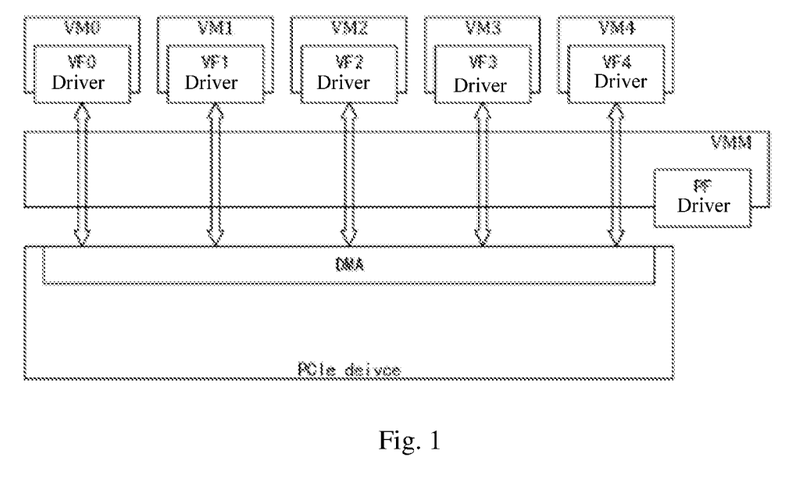
FIG. 1 is a block diagram of a virtualization system obtained by virtualization with SR-IOV.

As shown in FIG. 1, FIG. 1 is a block diagram of a virtualization system obtained by virtualization with SR-IOV. The hardware virtualization technology SR-IOV virtualizes a device into multiple Virtual Function (VF) ports for allocation to each VM. Each VM has an independent data path, and shares the same hardware device. The VF port accesses a Peripheral Component Interface Express (PCIe) device by Direct Memory Access (DMA). However, SR-IOV brings some new problems: each VF port has only part of configuration functions of the device, and only a Physical Function (PF) port has all configuration functions. For some configuration functions, the VF port may complete them only by means of the PF port. This involves communication between the VF port and the PF port.

At present, various manufacturers use various implementation solutions. For example, some implement communication between the VF port and the PF port by memory sharing with software, namely sharing a part of a host memory of the VMM to the VM. However, this implementation solution needs the support of a VMM software framework, but not all VMM software frameworks support this technology. Some use a software pipeline technology to transmit messages between the VF port and the PF port through a software pipeline. However, this implementation solution is relatively low in transmission efficiency, and is not supported by all VMM software frameworks. Some use a hardware queue technology to complete communication between the VF port and the PF port through a hardware message queue. This solution does not need the support of any VMM software framework, but a plenty of hardware resources are occupied, and the area of chip hardware is enlarged.

In summary, how to effectively solve the problems of dependence of command information transmission between a VF port and a PF port on the support of a VMM software framework, occupation of a plenty of hardware resources, low transmission efficiency, etc., is currently a problem urgent to be solved by those skilled in the art.

SUMMARY

An objective of the present disclosure is to provide a command information transmission method. The method is independent of support of a VMM software framework, occupation of hardware resources is greatly reduced, and the transmission efficiency is improved.

In order to solve the foregoing technical problem, the present disclosure provides the following technical solutions.

A command information transmission method is provided, which is applied to a PF port and includes:
parsing a received interrupt request to obtain a target VF port;
determining a target physical-side interrupt handler corresponding to the target VF port;
obtaining target command information corresponding to the target physical-side interrupt handler in a device memory overlap region, where the device memory overlap region is an overlap region obtained by performing memory mapping on the PF port and each VF port in a host address space by a device memory overlap mapping technology; and
executing switching to the target physical-side interrupt handler, and performing a response operation on the target command information.

In some implementation modes of the present disclosure, after the performing a response operation on the target command information, the method further includes:
in response to detecting that a command response operation is completed, setting a bit corresponding to the target VF port in a register as an interrupt clearing enabled status bit to perform an interrupt clearing operation on the target physical-side interrupt handler.

In some implementation modes of the present disclosure, after detecting that the command response operation is completed, the method further includes:
generating command response result information;
writing the command response result information to the device memory overlap region; and
sending an interrupt instruction to the target VF port such that the target VF port is switched to a target virtual-side interrupt handler corresponding to the interrupt instruction and reads the command response result information from the device memory overlap region.

In some implementation modes of the present disclosure, the method further includes:
in response to receiving an exit instruction, setting a bit corresponding to the PF port in the register as the interrupt clearing enabled status bit to perform the interrupt clearing operation on all physical-side interrupt handlers.

In some implementation modes of the present disclosure, the parsing a received interrupt request to obtain a target VF port includes:

obtaining a target interrupt enabled status bit in a first memory overlap partition that is only read by a PF port and only written by a VF port in the device memory overlap region; and determining the target VF port according to the target interrupt enabled status bit.

In some implementation modes of the present disclosure, the determining a target physical-side interrupt handler corresponding to the target VF port includes:

determining a target physical-side interrupt number corresponding to the target VF port; and determining the target physical-side interrupt handler according to the target physical-side interrupt number.

In some implementation modes of the present disclosure, the obtaining target command information corresponding to the target physical-side interrupt handler in a device memory overlap region includes:

determining a target data type corresponding to the target physical-side interrupt handler; and searching a target sub-region corresponding to the target data type in the device memory overlap region for the target command information.

In some implementation modes of the present disclosure, the searching a target sub-region corresponding to the target data type in the device memory overlap region for the target command information includes:

determining a second memory overlap partition that is only read by a VF port and only written by a PF port in the device memory overlap region; and searching the target sub-region corresponding to the target data type in the second memory overlap partition for the target command information.

A command information transmission system is provided, which is applied to a PF port and includes:

a VF port obtaining module, configured to parse a received interrupt request to obtain a target VF port;

an interrupt handler determining module, configured to determine a target physical-side interrupt handler corresponding to the target VF port;

a command information obtaining module, configured to obtain target command information corresponding to the target physical-side interrupt handler in a device memory overlap region, where the device memory overlap region is an overlap region obtained by performing memory mapping on the PF port and each VF port in a host address space by a device memory overlap mapping technology; and a command response module, configured to execute switching to the target physical-side interrupt handler, and perform a response operation on the target command information.

A command information transmission apparatus is provided, which includes:

a memory, configured to store a computer program; and a processor, configured to execute the computer program to implement the steps of the command information transmission method as described above.

A computer-readable storage medium is provided, which stores a computer program that is executed by a processor to implement the steps of the command information transmission method as described above.

The present disclosure provides a command information transmission method, applied to a PF port. A received interrupt request is parsed to obtain a target VF port. A target physical-side interrupt handler corresponding to the target VF port is determined. Target command information corresponding to the target physical-side interrupt handler in a device memory overlap region is obtained, where the device memory overlap region is an overlap region obtained by performing memory mapping on the PF port and each VF port in a host address space by a device memory overlap mapping technology. Switching to the target physical-side interrupt handler is executed, and a response operation is performed on the target command information.

It can be seen from the above technical solution that the device memory overlap region is obtained in advance by performing memory mapping on the PF port and each VF port in the host address space by the device memory overlap mapping technology, such that the PF port and each VF port may access the device memory overlap region, and command information transmission between the PF port and each VF port is implemented in combination with an interrupt technology. Command information transmission between the PF port and each VF port in the present disclosure is independent of support of a VMM software framework, occupation of hardware resources is greatly reduced, and the transmission efficiency is improved.

Accordingly, embodiments of the present disclosure also provide a command information transmission system and apparatus corresponding to the command information transmission method as well as a computer-readable storage medium, which all have the foregoing technical effects. Elaborations are omitted herein.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those ordinarily skilled in the art may further obtain other drawings according to these drawings without creative work.

DETAILED DESCRIPTION

In order to make the solutions of the present disclosure understood better by those skilled in the art, the present disclosure will be further described below in detail in combination with the drawings and implementation modes. Clearly, the described embodiments are not all but only part of embodiments of the present disclosure. All other embodiments obtained by those ordinarily skilled in the art based on the embodiments in the present disclosure without creative work shall fall within the scope of protection of the present disclosure.

Figure 2:
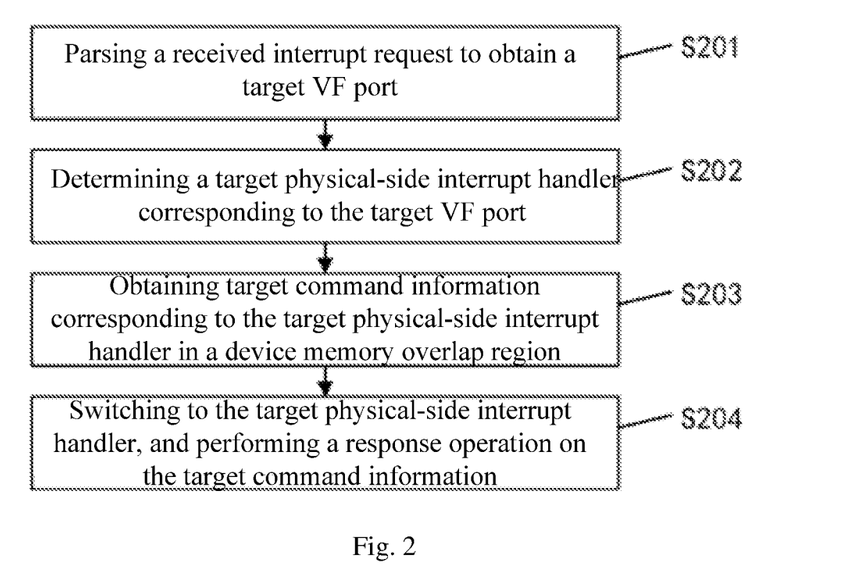
FIG. 2 is an implementation flowchart of a command information transmission method according to some embodiments of the present disclosure.

Referring to FIG. 2, FIG. 2 is an implementation flowchart of a command information transmission method according to some embodiments of the present disclosure. The method is applied to a PF port, and includes following steps.

In S201, a received interrupt request is parsed to obtain a target VF port.

When command information transmission is required, a target VF port corresponding to current command information transmission generates an interrupt request, and sends the interrupt request to the PF port. The interrupt request contains identification information of the target VF port. The PF port receives the interrupt request, and parses the interrupt request to obtain the target VF port.

In S202, a target physical-side interrupt handler corresponding to the target VF port is determined.

Corresponding physical-side interrupt handlers are preset for each VF port. After the target VF port is obtained by parsing, the target physical-side interrupt handler corresponding to the target VF port is determined.

In S203, target command information corresponding to the target physical-side interrupt handler in a device memory overlap region is obtained.

The device memory overlap region is an overlap region obtained by performing memory mapping on the PF port and each VF port in a host address space by a device memory overlap mapping technology.

An overlap region is obtained by performing the memory mapping on the PF port and each VF port in the host address space by the device memory overlap mapping technology. The overlap region is the device memory overlap region. The target VF port writes the target command information corresponding to current command information transmission to the device memory overlap region in advance. After the target physical-side interrupt handler corresponding to the target VF port is determined, the target command information corresponding to the target physical-side interrupt handler in the device memory overlap region is obtained.

In S204, the target physical-side interrupt handler is switched, and a response operation is performed on the target command information.

After the target command information is obtained, switching to the target physical-side interrupt handler, and a response operation is performed on the target command information. Therefore, communication is established between the target VF port and the PF port to complete the command response operation by use of complete configuration functions of the PF port. Command information transmission between the PF port and each VF port in the present disclosure is independent of support of a VMM software framework and faster than a pure software communication mechanism, occupation of hardware resources is greatly reduced, and the transmission efficiency is improved.

It can be seen from the above technical solution that the device memory overlap region is obtained in advance by performing the memory mapping on the PF port and each VF port in the host address space by the device memory overlap mapping technology, such that the PF port and each VF port may access the device memory overlap region, and notification and handshake processes in communication between the PF port and each VF port are implemented in combination with an interrupt technology to further implement command information transmission between the PF port and each VF port. Command information transmission between the PF port and each VF port in the present disclosure is independent of support of a VMM software framework, occupation of hardware resources is greatly reduced, and the transmission efficiency is improved.

It is to be noted that, based on the above embodiment, some embodiments of the present disclosure also provide a corresponding improved solution. References may be made between the same steps or corresponding steps in the following embodiment and the above embodiment and between corresponding beneficial effects. Elaborations are omitted in the following improved embodiment.

Figure 3:
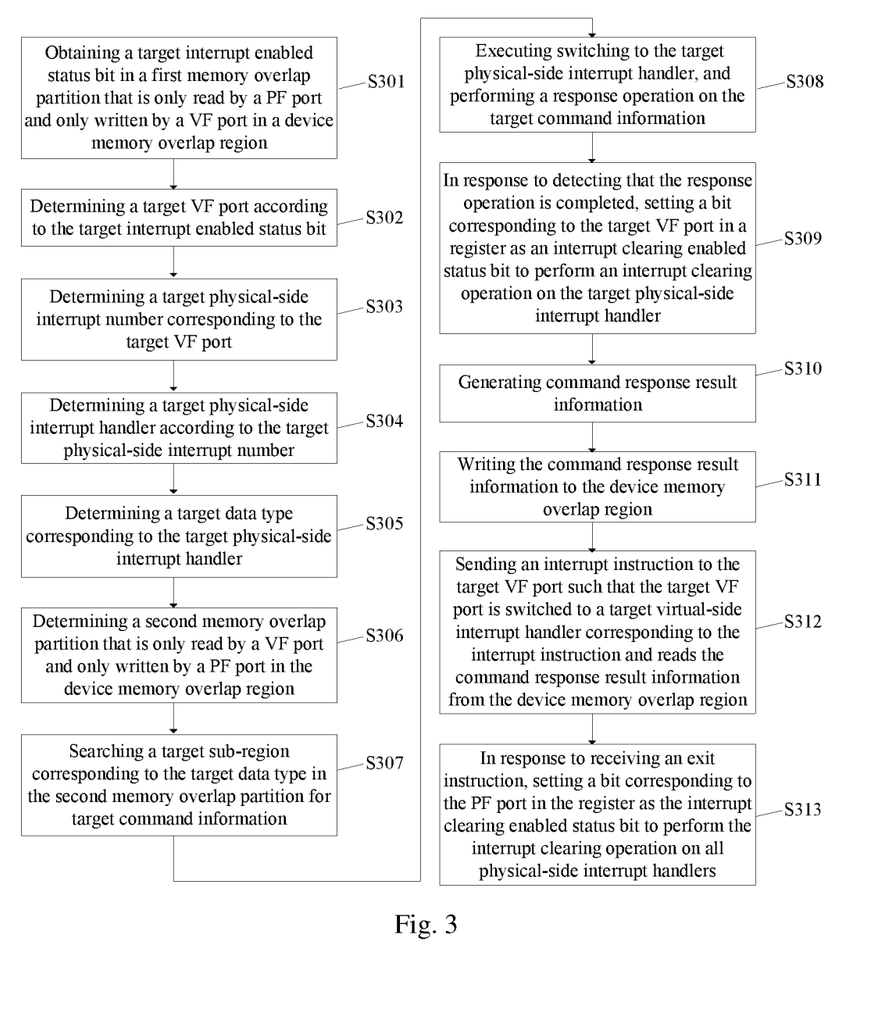
FIG. 3 is another implementation flowchart of a command information transmission method according to some embodiments of the present disclosure.

Referring to FIG. 3, FIG. 3 is another implementation flowchart of a command information transmission method according to some embodiments of the present disclosure. The method is applied to a PF port, and may include following steps.

In S301, a target interrupt enabled status bit in a first memory overlap partition that is only read by a PF port and only written by a VF port in a device memory overlap region is obtained.

After the device memory overlap region is obtained by the performing memory mapping on the PF port and each VF port in a host address space by the device memory overlap mapping technology, since data transmission between the PF port and each VF port is bidirectional, for avoiding data disorder and transmission failure caused by the fact that the PF port and a VF port write data to the same part in the device memory overlap region and data written later overwrites data that has been written by the other, the device memory overlap region is divided in advance into a first memory overlap partition that only read by a PF port and only written by a VF port and a second memory overlap partition that is only read by a VF port and only written by a PF port, to prevent interference between the PF port and each VF port. Whether there is an interrupt enabled status bit in the first memory overlap partition that is only read by a PF port and only written by a VF port in the device memory overlap region is detected in real time or at a certain time interval. If YES, a target interrupt enabled status bit in the first memory overlap partition that is only read by a PF port and only written by a VF port in the device memory overlap region is obtained.

In S302, a target VF port is determined according to the target interrupt enabled status bit.

After the target interrupt enabled status bit in the first memory overlap partition that is only read by a PF port and only written by a VF port in the device memory overlap region is obtained, the target VF port is determined according to the target interrupt enabled status bit.

In S303, a target physical-side interrupt number corresponding to the target VF port is determined.

A corresponding physical-side interrupt number is preset for each VF port. After the target VF port is obtained by parsing, a target physical-side interrupt number corresponding to the target VF port is determined.

In S304, a target physical-side interrupt handler is determined according to the target physical-side interrupt number.

Each physical-side interrupt number corresponds to a certain physical-side interrupt handler. After the target physical-side interrupt number corresponding to the target VF port is determined, a target physical-side interrupt handler is determined according to the target physical-side interrupt number.

In S305, a target data type corresponding to the target physical-side interrupt handler is determined.

A corresponding data type is preset for each physical-side interrupt handler. After the target physical-side interrupt handler is determined, a target data type corresponding to the target physical-side interrupt handler is determined. For example, the data type may include configuring a bandwidth of a hardware device, configuring a whole device in a low-power mode, and configuring the g device in a full-speed operation mode.

In S306, a second memory overlap partition that is only read by a VF port and only written by a PF port in the device memory overlap region is determined.

The device memory overlap region is the overlap region obtained by performing the memory mapping on the PF port and each VF port in the host address space by the device memory overlap mapping technology.

After the target data type corresponding to the target physical-side interrupt handler is determined, the second memory overlap partition that is only read by a VF port and only written by a PF port in the device memory overlap region is determined.

In S307, a target sub-region corresponding to the target data type in the second memory overlap partition is searched for target command information.

After the second memory overlap partition that is only read by a VF port and only written by a PF port in the device memory overlap region is determined, the target sub-region corresponding to the target data type in the second memory overlap partition is searched for the target command information. For example, corresponding class numbers are written to beginning of sub-regions corresponding to each data type in advance, and the target sub-region corresponding to the target data type is determined based on the class number.

In S308, the target physical-side interrupt handler is switched, and a response operation is performed on the target command information.

After the target command information is found, switching to the target physical-side interrupt handler, and the response operation is performed on the target command information. In some embodiments, a bit corresponding to the target VF port in a register is set as an interrupt enabled status bit, for example, a corresponding physical-side interrupt bit is set to 1, thereby implementing switching to the target physical-side interrupt handler.

In S309, in response to detecting that the response operation is completed, a bit corresponding to the target VF port in a register is set as an interrupt clearing enabled status bit to perform an interrupt clearing operation on the target physical-side interrupt handler.

When the response operation is performed, whether the response operation is completed may be detected in real time or at a certain time interval. In response to a detection that the response operation is completed, a bit corresponding to the target VF port in the register is set as the interrupt clearing enabled status bit, for example, a physical-side interrupt clearing bit is set to 1, to perform the interrupt clearing operation on the target physical-side interrupt handler.

In S310, command response result information is generated.

The command response result information of performing the response operation on the target command information is generated.

In S311, the command response result information is written to the device memory overlap region.

After the command response result information is generated, the command response result information is written to the device memory overlap region.

In S312, an interrupt instruction is sent to the target VF port such that the target VF port is switched to a target virtual-side interrupt handler corresponding to the interrupt instruction and reads the command response result information from the device memory overlap region.

After the command response result information is written into the device memory overlap region, an interrupt instruction is sent to the target VF port. After receiving the interrupt instruction, the target VF port is switched to a target virtual-side interrupt handler corresponding to the interrupt instruction, for example, setting a corresponding virtual interrupt bit to 1, and reads the command response result information from the device memory overlap region. Therefore, the target VF port obtains the command response result information, and then sets a virtual-side interrupt clearing bit as 1 to perform an interrupt clearing operation on the target virtual-side interrupt handler.

In S313, in response to receiving an exit instruction, a bit corresponding to the PF port in the register is set as the interrupt clearing enabled status bit to perform the interrupt clearing operation on all physical-side interrupt handlers.

When the PF port is required to exit, an exit instruction is sent to the PF port. After receiving the exit instruction, the PF port sets a bit corresponding to the PF port in the register as the interrupt clearing enabled status bit to implement the interrupt clearing operation on all physical-side interrupt handlers, and is not required to perform the interrupt clearing operation on each target physical-side interrupt handler one by one. Therefore, the interrupt clearing efficiency is greatly improved.

The present embodiment differs from embodiment 1 corresponding to the technical solution claimed by independent claim 1 as follows: the technical solutions correspondingly claimed by dependent claims 2 to 8 is added. Certainly, the technical solution correspondingly claimed by each dependent claim may be flexibly combined according to different actual situations and requirements without affecting the completeness of the solution, so as to meet requirements of different application scenarios better. The present embodiment only presents the best solution including most solutions, and cannot list all possible solutions one by one due to the complex situation. It can be realized by those skilled in the art that many examples may be created without enough creative efforts according to the basic method principle provided in the present application and in combination with the actual situation, which shall fall within the scope of protection of the present application.

Corresponding to the above method embodiment, some embodiments of the present disclosure also provides a command information transmission system. Corresponding references may be made between the command information transmission system described below and the command information transmission method described above.

Figure 4:
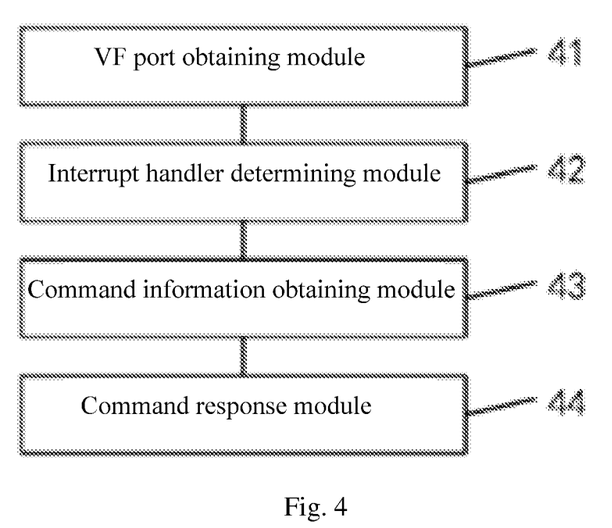
FIG. 4 is a structural block diagram of a command information transmission system according to some embodiments of the present disclosure.

Referring to FIG. 4, FIG. 4 is a structural block diagram of a command information transmission system according to some embodiments of the present disclosure. The system is applied to a PF port, and may include:

a VF port obtaining module 41, configured to parse a received interrupt request to obtain a target VF port;

an interrupt handler determining module 42, configured to determine a target physical-side interrupt handler corresponding to the target VF port;

a command information obtaining module 43, configured to obtain target command information corresponding to the target physical-side interrupt handler in a device memory overlap region, where the device memory overlap region is an overlap region obtained by performing memory mapping on the PF port and each VF port in a host address space by a device memory overlap mapping technology; and a command response module 44, configured to execute switching to the target physical-side interrupt handler, and perform a response operation on the target command information.

It can be seen from the above technical solution that the device memory overlap region is obtained in advance by performing memory mapping on the PF port and each VF port in the host address space by the device memory overlap mapping technology, such that the PF port and each VF port may access the device memory overlap region, and command information transmission between the PF port and each VF port is implemented in combination with an interrupt technology. Command information transmission between the PF port and each VF port in the present disclosure is independent of support of a VMM software framework, occupation of hardware resources is greatly reduced, and the transmission efficiency is improved.

In some implementation modes of the present disclosure, the system may further include:

a first interrupt clearing module, configured to, after the response operation is performed on the target command information, in response to detecting that command response operation is completed, set a bit corresponding to the target VF port in a register as an interrupt clearing enabled status bit to perform an interrupt clearing operation on the target physical-side interrupt handler.

In some implementation modes of the present disclosure, the system may further include:

a response result generation module, configured to generate command response result information after detecting that the command response operation is completed;

a response result writing module, configured to write the command response result information to the device memory overlap region; and a response result reading module, configured to send an interrupt instruction to the target VF port such that the target VF port is switched to a target virtual-side interrupt handler corresponding to the interrupt instruction and reads the command response result information from the device memory overlap region.

In some implementation modes of the present disclosure, the system may further include:

a second interrupt clearing module, configured to, in response to receiving an exit instruction, set a bit corresponding to the PF port in the register as the interrupt clearing enabled status bit to perform the interrupt clearing operation on all physical-side interrupt handlers.

In some implementation modes of the present disclosure, the VF port obtaining module 41 includes:

an interrupt enabled bit obtaining submodule, configured to obtain a target interrupt enabled status bit in a first memory overlap partition that is only read by a PF port and only written by a VF port in the device memory overlap region; and a VF port determining submodule, configured to determine the target VF port according to the target interrupt enabled status bit.

In some implementation modes of the present disclosure, the interrupt handler determining module 42 includes:

an interrupt number determining submodule, configured to determine a target physical-side interrupt number corresponding to the target VF port; and an interrupt handler determining submodule, configured to determine the target physical-side interrupt handler according to the target physical-side interrupt number.

In some implementation modes of the present disclosure, the command information obtaining module 43 includes:

a data type determining submodule, configured to determine a target data type corresponding to the target physical-side interrupt handler; and a command information searching submodule, configured to search a target sub-region corresponding to the target data type in the device memory overlap region for the target command information.

In some implementation modes of the present disclosure, the command information searching submodule includes:

a memory overlap partition determining unit, configured to determine a second memory overlap partition that is only read by a VF port and only written by a PF port in the device memory overlap region; and a command information searching unit, configured to search the target sub-region corresponding to the target data type in the second memory overlap partition for the target command information.

Figure 5:
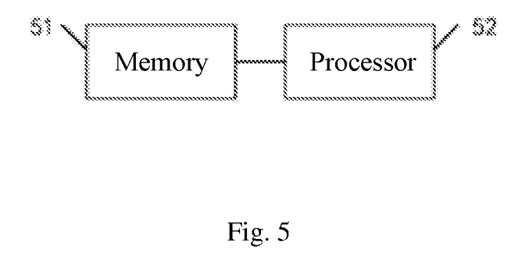
FIG. 5 is a structural block diagram of a command information transmission apparatus according to some embodiments of the present disclosure.

Corresponding to the above method embodiment, referring to FIG. 5, FIG. 5 is a schematic diagram of a command information transmission apparatus according to the present disclosure. The apparatus may include:

a memory 51, configured to store a computer program; and a processor 52, configured to execute the computer program stored in the memory 51 to implement the following steps:

parsing a received interrupt request to obtain a target VF port; determining a target physical-side interrupt handler corresponding to the target VF port; obtaining target command information corresponding to the target physical-side interrupt handler in a device memory overlap region, where the device memory overlap region is an overlap region obtained by performing memory mapping on the PF port and each VF port in a host address space by a device memory overlap mapping technology; and executing switching to the target physical-side interrupt handler, and performing a response operation on the target command information.

Introductions about the apparatus provided in the present disclosure refer to the method embodiment, and elaborations are omitted in the present disclosure.

Figure 6:
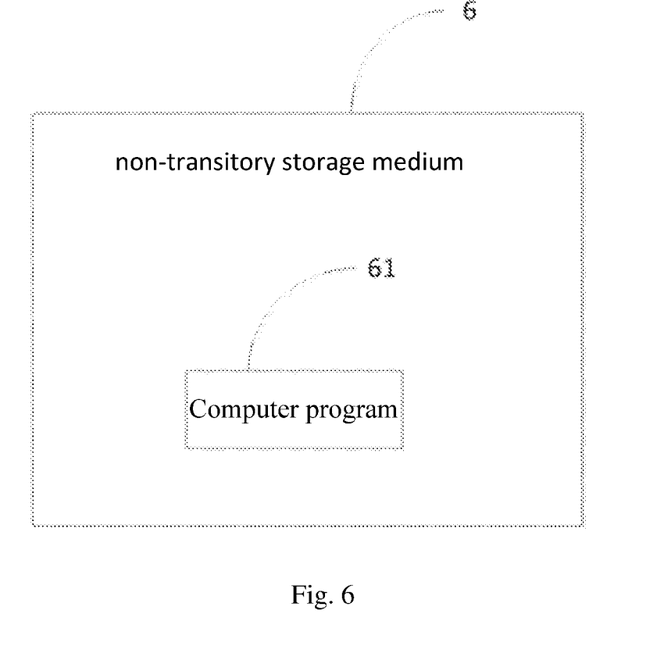
FIG. 6 is a schematic diagram of a computer-readable storage medium according to some embodiments of the present disclosure.

Corresponding to the above method embodiment, the present disclosure also provides a computer-readable storage medium 6. As shown in FIG. 6, the computer-readable storage medium 6 stores a computer program 61 that may be executed by a processor to implement the following steps:

parsing a received interrupt request to obtain a target VF port; determining a target physical-side interrupt handler corresponding to the target VF port; obtaining target command information corresponding to the target physical-side interrupt handler in a device memory overlap region, where the device memory overlap region is an overlap region obtained by performing memory mapping on the PF port and each VF port in a host address space by a device memory overlap mapping technology; and executing switching to the target physical-side interrupt handler, and performing a response operation on the target command information.

The computer-readable storage medium may include various media capable of storing program codes, such as a U disk, a mobile hard disk, a Read-Only Memory (ROM), a Random Access Memory (RAM), a magnetic disk, or an optical disk.

Introductions about the computer-readable storage medium provided in the present disclosure refer to the method embodiment, and elaborations are omitted in the present disclosure.

Each embodiment in the description is described progressively. Descriptions made in each embodiment focus on differences from the other embodiments, and the same or similar parts in each embodiment refer to the other embodiments. The apparatus, device, and computer-readable storage medium disclosed in the embodiments correspond to the method disclosed in the embodiments, and thus are described relatively briefly, and related parts refer to the descriptions about the method.

The principle and implementation modes of the present disclosure are described herein with examples, and the descriptions about the above embodiments are only for helping in understanding the technical solution and core idea of the present disclosure. It is to be pointed out that those ordinarily skilled in the art may further make a plurality of improvements and embellishments to the present disclosure without departing from the principle of the present disclosure, and these improvements and embellishments shall also fall within the scope of protection of the claims of the present disclosure.

The invention claimed is:

1. A command information transmission method, wherein the method is applied to a Physical Function (PF) port and comprises:
    parsing a received interrupt request to obtain a target Virtual Function (VF) port;
    determining a target physical-side interrupt handler corresponding to the target VF port;
    obtaining target command information corresponding to the target physical-side interrupt handler in a device memory overlap region, wherein the device memory overlap region is an overlap region obtained by performing memory mapping on the PF port and each VF port in a host address space by a device memory overlap mapping technology; and
    switching to the target physical-side interrupt handler, and performing a response operation on the target command information;
    wherein the parsing a received interrupt request to obtain a target VF port comprises:
        obtaining a target interrupt enabled status bit in a first memory overlap partition that is only read by a PF port and only written by a VF port in the device memory overlap region; and
        determining the target VF port according to the target interrupt enabled status bit.

2. The command information transmission method according to claim 1, wherein after the performing a response operation on the target command information, the method further comprises:
    in response to detecting that a command response operation is completed, setting a first bit corresponding to the target VF port in a register as an interrupt clearing enabled status bit to perform an interrupt clearing operation on the target physical-side interrupt handler.

3. The command information transmission method according to claim 2, wherein after detecting that the command response operation is completed, the method further comprises:
    generating command response result information;
    writing the command response result information to the device memory overlap region; and
    sending an interrupt instruction to the target VF port such that the target VF port is switched to a target virtual-side interrupt handler corresponding to the interrupt instruction and reads the command response result information from the device memory overlap region.

4. The command information transmission method according to claim 2, comprising:
    in response to receiving an exit instruction, setting a second bit corresponding to the PF port in the register as the interrupt clearing enabled status bit to perform the interrupt clearing operation on all physical-side interrupt handlers.

5. The command information transmission method according to claim 2, wherein the switching to the target physical-side interrupt handler comprises:
    setting the first bit corresponding to the target VF port as an interrupt enabled status bit to switch to the target physical-side interrupt handler.

6. The command information transmission method according to claim 1, wherein the parsing a received interrupt request to obtain a target VF port comprises:
    obtaining identification information of the target VF port in the received interrupt request; and
    obtaining the target VF port according to the identification information.

7. The command information transmission method according to claim 1, wherein before the determining a target physical-side interrupt handler corresponding to the target VF port, the method further comprises:
    setting corresponding physical-side interrupt handlers for each VF port.

8. The command information transmission method according to claim 1, wherein before the obtaining target command information corresponding to the target physical-side interrupt handler in a device memory overlap region, the method further comprises:
    writing the target command information to the device memory overlap region according to the target VF port.

9. The command information transmission method according to claim 1, wherein the performing a response operation on the target command information comprises:
    establishing communication between the target VF port and the PF port; and
    performing the response operation by use of the PF port.

10. The command information transmission method according to claim 1, wherein the determining a target physical-side interrupt handler corresponding to the target VF port comprises:
    determining a target physical-side interrupt number corresponding to the target VF port; and
    determining the target physical-side interrupt handler according to the target physical-side interrupt number.

11. The command information transmission method according to claim 10, wherein the obtaining target command information corresponding to the target physical-side interrupt handler in a device memory overlap region comprises:
    determining a target data type corresponding to the target physical-side interrupt handler; and
    searching a target sub-region corresponding to the target data type in the device memory overlap region for the target command information.

12. The command information transmission method according to claim 11, wherein the searching a target sub-region corresponding to the target data type in the device memory overlap region for the target command information comprises:

determining a second memory overlap partition that is only read by a VF port and only written by a PF port in the device memory overlap region; and     searching the target sub-region corresponding to the target data type in the second memory overlap partition for the target command information.

13. The command information transmission method according to claim 12, wherein before the determining a second memory overlap partition that is only read by a VF port and only written by a PF port in the device memory overlap region, the method further comprises:

dividing the device memory overlap region to obtain the second memory overlap partition.

14. The command information transmission method according to claim 11, wherein before the searching a target sub-region corresponding to the target data type in the device memory overlap region for the target command information, the method further comprises:

writing corresponding class numbers to sub-regions corresponding to each data type; and     determining the target sub-region corresponding to the target data type based on the corresponding class numbers.

15. A command information transmission apparatus, comprising:

a memory, configured to store a computer program; and at least one processor, configured to execute the computer program to:

parse a received interrupt request to obtain a target Virtual Function (VF) port;

determine a target physical-side interrupt handler corresponding to the target VF port;

obtain target command information corresponding to the target physical-side interrupt handler in a device memory overlap region, wherein the device memory overlap region is an overlap region obtained by performing memory mapping on a Physical Function (PF) port and each VF port in a host address space by a device memory overlap mapping technology; and         switch to the target physical-side interrupt handler, and perform a response operation on the target command information;

wherein the at least one processor is configured to execute the computer program to:

obtain a target interrupt enabled status bit in a first memory overlap partition that is only read by a PF port and only written by a VF port in the device memory overlap region; and         determine the target VF port according to the target interrupt enabled status bit.

16. A non-transitory computer-readable storage medium, storing a computer program that is executed by at least one processor, wherein upon execution by the at least one processor, the computer program is configured to cause the at least one processor to:

parse a received interrupt request to obtain a target Virtual Function (VF) port;

determine a target physical-side interrupt handler corresponding to the target VF port;

obtain target command information corresponding to the target physical-side interrupt handler in a device memory overlap region, wherein the device memory overlap region is an overlap region obtained by performing memory mapping on a Physical Function (PF) port and each VF port in a host address space by a device memory overlap mapping technology; and     switch to the target physical-side interrupt handler, and perform a response operation on the target command information;

wherein the computer program is configured to cause the at least one processor to:

obtain a target interrupt enabled status bit in a first memory overlap partition that is only read by a PF port and only written by a VF port in the device memory overlap region; and         determine the target VF port according to the target interrupt enabled status bit.

17. The command information transmission method according to claim 9, wherein the performing the response operation by use of the PF port comprises:

performing the response operation by use of complete configuration functions of the PF port.

18. The command information transmission method according to claim 1, wherein before the obtaining a target interrupt enabled status bit in a first memory overlap partition that is only read by a PF port and only written by a VF port in the device memory overlap region, the method further comprises:

detecting whether there is the target interrupt enabled status bit in the first memory overlap partition in real time or at a certain time interval; and     in response to a detection that there is the target interrupt enabled status bit in the first memory overlap partition, obtaining the target interrupt enabled status bit in the first memory overlap partition.

19. The command information transmission method according to claim 1, wherein before the obtaining a target interrupt enabled status bit in a first memory overlap partition that is only read by a PF port and only written by a VF port in the device memory overlap region, the method further comprises:

dividing the device memory overlap region to obtain the first memory overlap partition.

\* \* \* \* \*